July 2, 1935.  W. VAN PATTENSTEIGER  2,007,031
LIQUID METERING INSTRUMENT
Filed Oct. 20, 1932   2 Sheets-Sheet 1
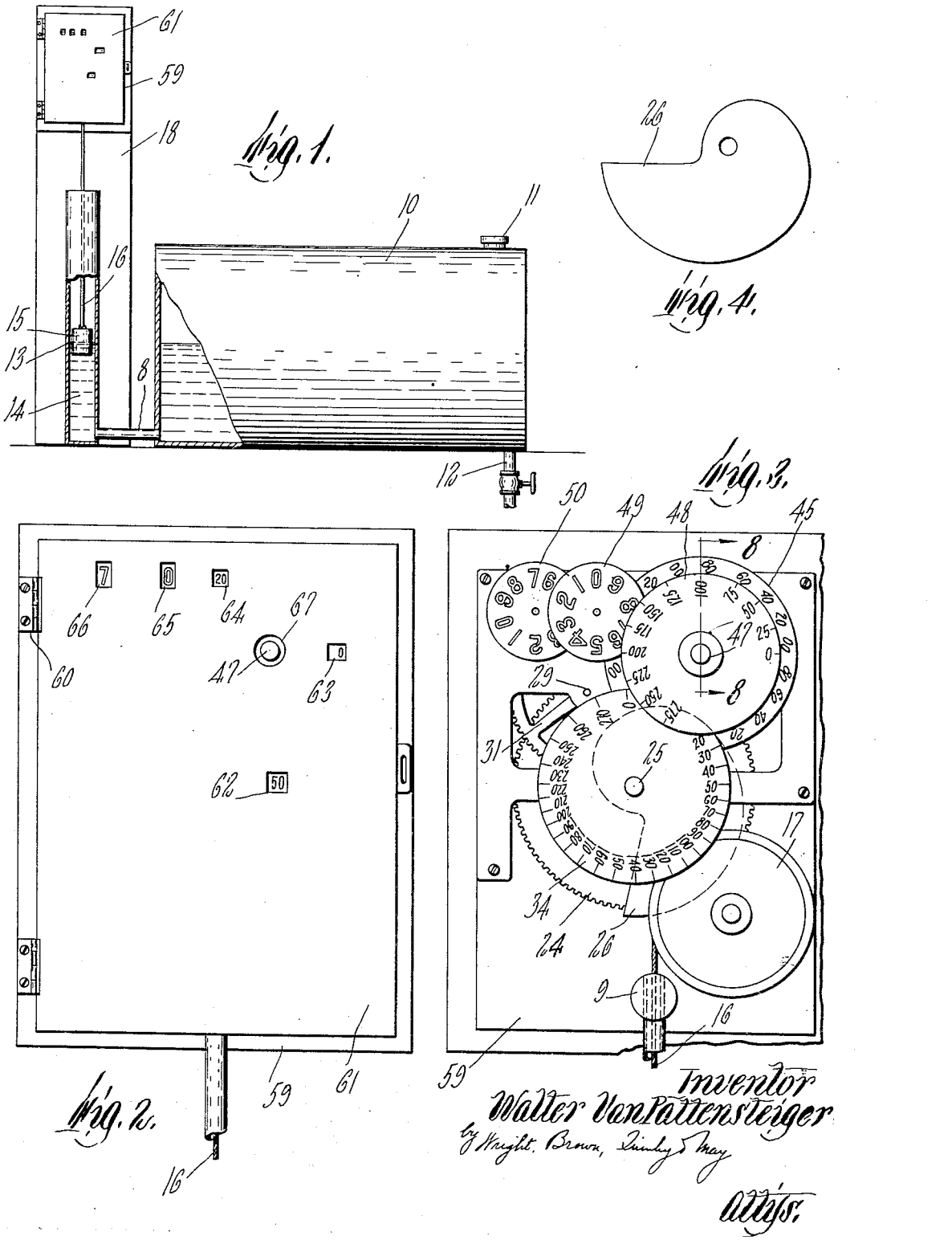

July 2, 1935.  W. VAN PATTENSTEIGER  2,007,031
LIQUID METERING INSTRUMENT
Filed Oct. 20, 1932  2 Sheets-Sheet 2

Inventor
Walter Van Pattensteiger
by Wright, Brown, Quinby & May
Attys.

Patented July 2, 1935

2,007,031

UNITED STATES PATENT OFFICE 2,007,031

LIQUID METERING INSTRUMENT

Walter van Pattensteiger, Auburndale, Mass., assignor to D. Allen Lenk, Newton Lower Falls, Mass.

Application October 20, 1932, Serial No. 638,751

3 Claims. (Cl. 73—82)

This invention relates to liquid metering instruments more particularly of the type to be installed in connection with tanks which hold a liquid supply and which are replenished with liquid from time to time as liquid is withdrawn therefrom. The instrument of the present invention can be assembled, for instance, with an oil storage stank, such as forms part of the usual oil burning equipment.

While not restricted thereto, the metering instrument of the present invention is adapted more specifically for use in connection with a tank, such as an oval or cylindrical one stationed with its axis extending horizontally, whose cross-sectional area is a variable from its bottom to its top. Such tanks are customarily employed to hold the supply of oil for household oil-burning equipment and in other connections. Heretofore, the householder has had no practical way of checking up on the oil delivered to him, the oil consumed over a period of time, or the oil present in the tank at any particular time. The instrument of the present invention is designed to apprise him of this desired information, the invention consisting not only in the instrument itself, but also in the combination of the instrument with the tank of varying cross-sectional area with which it is used. As already observed, the instrument of the present invention includes means for indicating the volume of liquid delivered into a tank of varying cross-sectional area at any time, means for indicating the total volume of liquid delivered into the tank at intervals, and means for indicating the volume of liquid present in the tank at any time. The instrument is so organized that all of its indicating means are interconnected and actuated by a rise in the liquid level in the tank, but the means for indicating the volume of liquid present in the tank at any time is disconnected from the other indicating means and is the only one actuated by a fall in the liquid level. The rise and fall of the liquid level in the tank is communicated by suitable mechanism to a shaft in the metering instrument in a manner such that the shaft is caused to rotate at a corresponding rate. Then, by a cam fixed to the shaft and a cam follower this rotary motion is transmitted to another shaft, which, by virtue of the shape of the cam, is caused to rotate at a rate corresponding with the volume of the liquid delivered into the tank. It is thus seen that by associating a properly graduated dial with the cam shaft, it is possible to indicate the volume of the liquid present in the tank at any time. So, too, by associating suitable indicating mechanism with the second shaft, it is possible to indicate the total volume of liquid deliver into the tank at intervals. Still further, a dial may be associated with the second shaft and be actuated thereby to indicate the volume of liquid delivered into the tank at any time, the dial being capable of being reset by hand to a zero reading at any time. The second shaft is caused to become disconnected from the cam shaft by a fall in the liquid level in the tank, wherefore only the cam shaft and the dial which gives a reading of the volume of liquid in the tank at any time is actuated by a fall in the liquid level.

With the foregoing and other features and objects in view, my invention will now be described in greater detail in conjunction with the accompanying drawings, wherein Figure 1 is a front view, partly broken away, of an assembly of the metering instrument of the present invention and a tank Figure 2 represents an enlarged front view of the instrument box with its cover closed.

Figure 3 is a similar view with the cover removed to show the various dials.

Figure 4 shows the general cam shape employed in connection with a cylindrical tank.

Figure 5:
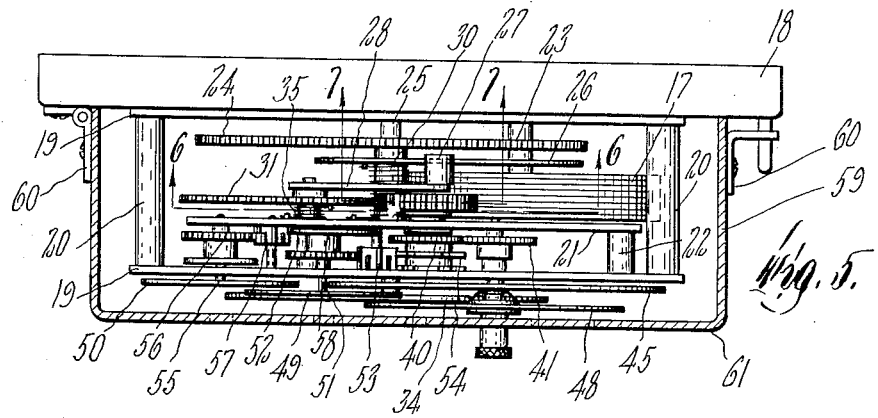
Figure 5 is a plan view of the instrument.
Figure 6:
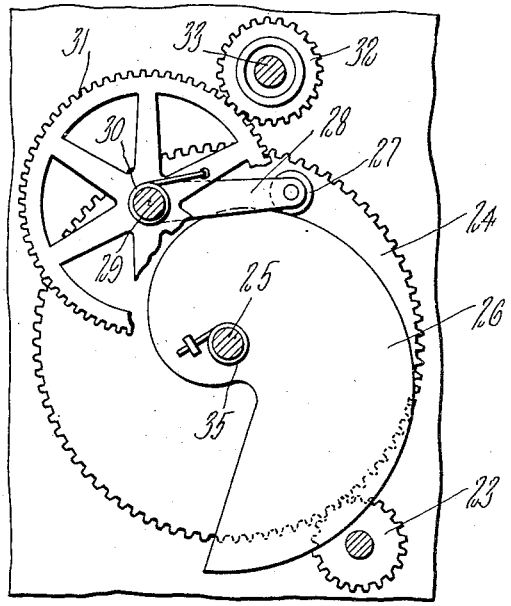
Figure 7:
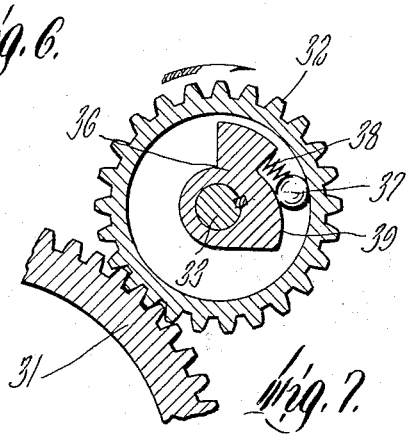

Figures 6 and 7 represent sections taken on the lines 6—6 and 7—7, respectively, of Figure 5.

Figure 8:
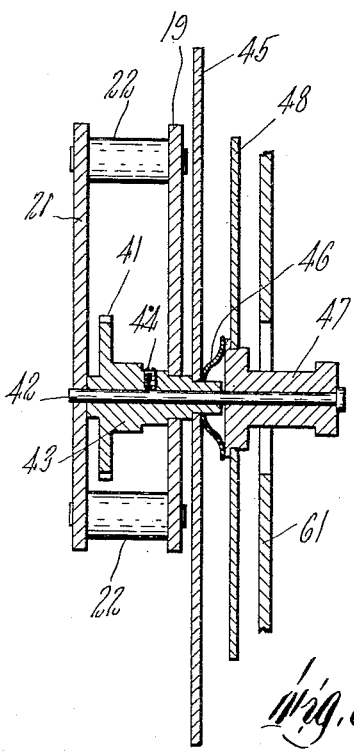

Figure 8 is an enlarged sectional detail on the line 8—8 of Figure 3, including the instrument cover.

Referring now in detail to the drawings, the metering instrument may, as shown in Figure 1, be assembled with a cylindrical tank 10 which is stationed with its axis extending horizontally and whose cross-sectional area is hence a variable from its bottom to its top. The tank may be provided with an opening 11 at its top, through which liquid may be introduced into the tank, and with a valved outlet 12 at its bottom, through which the liquid may be withdrawn as desired. Arranged alongside one end of the tank may be a vertical standpipe 13 whose lower end is closed and whose upper end is open. The standpipe may communicate by a pipe 8 near its lower end, with the bottom of the tank, so as to be furnished with a pool of liquid 14 whose level rises and falls in the same way as does the liquid level in the tank 10. The rise and fall of the liquid level in the pool 14 is utilized to cause an actuation of the metering instrument of the present invention. Thus, as shown in Figure 1, there is a float 15 which is suspended from a cord or wire 16 and remains partially submerged in the pool 14 at all times. Should there be any slack in the cord as a result of pouring liquid into the tank 10 and the rise of the liquid level in the pool 14, this slack is taken up by the rotation of a tensioned roll or spool 17, which, as best shown in Figure 3, forms part of the meter proper.

The meter proper may be located at any convenient place above the standpipe 13. For instance, it may be fastened to a vertical panel board 18, somewhat above the standpipe. Or, when the tank is not conveniently accessible, say is in a cellar, the meter proper may be located in a room above the cellar, or in any other convenient place, as all that is necessary is to provide a cord 16 of adequate length. The cord 16 may be suitably guided on its way to the roll 17, a guide 9 being shown in Figure 3 immediately below the roll 17. The float 15 should be of sufficient weight to overcome the tension in the roll 17 and to fall with a drop in the liquid level in the standpipe 13.

The meter proper is, as best shown in Figure 5, compactly built upon a framework comprising spaced plates 19 tied together, as by posts 20, and a plate 21 arranged between the plates 19 and tied to the front plate 19, as by pins 22. The roller 17 is, as already indicated, caused to rotate, by virtue of its being tensioned, when there is slack in the cord 16. This rotative movement is transmitted through a gear 23 on the same shaft as the roller 17 to a gear 24 which is fixed to a cam shaft 25. The shaft 25 has affixed thereto an edge cam 26 whose edge is designed as a function of the varying cross-sectional area of the tank,—in this case a cylindrical tank. The design is such that a cam follower consisting of a roller 27 riding in contact with the edge of the cam and an arm 28 whose outer end is fixed to a shaft 29 causes a rotation of the shaft 29 at a rate corresponding with the volume of liquid delivered into the tank 10. The roller 27 is pivotally secured to the inner end of the arm 28 and is kept in contact with the edge of the cam 26 by a coil spring 30 encompassing the shaft 29 and one end of which is fastened to a gear 31 on the shaft 29 and the other end of which is fastened to the frame 21. The gear 31 meshes with an annular gear 32, which is clutched by suitable means to a shaft 33 only when there is a rise in the liquid level in the tank 10. It is the shaft 33 which actuates the means for indicating the volume of liquid delivered into the tank 10 at any time, and the means for totalizing and indicating the volume of liquid delivered into the tank at intervals, as will presently be described.

Returning now to the shaft 25, which is caused to rotate at a rate corresponding with the rise and fall of the liquid level in the tank 10, it is obvious that a dial may be associated therewith and be so graduated as to give a direct reading of the volume of liquid in the tank. Thus, the front end portion of this shaft may pass through the front plate 19 and have affixed thereto a dial 34, as shown in Figure 3. This dial may be graduated to give a direct reading of the volume of liquid in the tank in the desired units, say in tens of gallons. The shaft 25 may be so tensioned as to induce the desired rotative movement of the roll 17 when there is slack in the cord 16. To this end, a coil spring 30, one end of which engages the cam 26 and the other end of which is anchored to the plate 21, may encompass the shaft 25, as shown in Figure 5, to furnish the desired tensioning effect.

As already stated, the annular gear 32 causes the shaft 33 to rotate only with a rise in the liquid level in the tank 10. For this purpose, the shaft 33 has affixed thereto a clutch comprising a block 36 and a ball 37 suspended by a coil spring 38 from the block and confined between the internal surface of the gear 32 and a curved edge portion 39 of the block. The clearance space between the portion 39 and the internal surface of the gear gradually diminishes or tapers in a clockwise direction, wherefore, when the gear 32 is caused to rotate in a clockwise direction, as shown by arrow in Figure 7, pursuant to a rise in the liquid level in the tank 10, the ball 37 is wedged in between the gear and block 36, thereby causing a rotation of the shaft 33. When the gear 32 is caused to rotate in an anticlockwise direction, however, pursuant to a fall in the liquid level in the tank 10, the internal surface of the gear 32 simply slides past the ball and no rotation of the shaft 33 takes place. It is, of course, possible to employ other suitable mechanism for permitting the shaft 33 to rotate only in the desired direction.

The shaft 33 has affixed thereto a gear 40 in mesh with a gear 41 whose shaft 42, as best shown in Figure 8, bridges the plate 21 and the front plate 19 and projects forwardly through the latter plate. The gear 41 has an elongated hub 43 affixed, as by a set screw 44, to the shaft 42 and passing through the front plate 19, in which it is journaled for rotation. The front end portion of the hub 43 carries affixed thereto a dial 45, which may be graduated to indicate the volume of liquid delivered into the tank in, let us say, units of twenties of gallons, as shown in Figure 3. Affixed to the hub 43 in front of the dial 45 may be a pair of spring clips 46 arranged to engage frictionally the inner face of a knob 47 loosely mounted on the front end portion of the shaft 42. The rear end portion of the knob carries a dial 48, which may be graduated to indicate the volume of liquid delivered into the tank in terms of say, increments of twenty-five gallons. The dial 48 may be reset by hand, without disturbing the shaft 42 or the rest of the mechanism, to a zero reading at each filling of the tank, and thereby serves to indicate the volume of liquid delivered into the tank at any time. Such resetting of the dial 48 is possible because the slight force necessary to overcome the frictional engagement by the spring clips 46 is much less than that necessary to effect an actuation of the rest of the mechanism.

It is desirable that the meter have dials which register in terms of larger units, such as hundreds of gallons and thousands of gallons, so that the total volume delivered into the tank over a considerable period of time be ascertainable. To this end, I may provide the dials 49 and 50, which may derive their rotation from the shaft 33 through suitable gear trains and which may be graduated in terms of hundreds of gallons and thousands of gallons, respectively. The dial 49 may be affixed to a shaft 51, which extends between the plate 21 and the front plate 19, and which carries a gear 52 meshing with an idler gear 53 which, in turn, meshes with the gear 54 on the shaft 33. The gear 54 may make one revolution for every tenth of a revolution made by the shaft 51. The dial 50 may similarly be affixed to the shaft 55, which extends between the plate 21 and the front plate 19, and which is driven by a gear 56 affixed thereto and meshing with an idler gear 57, which, in turn, meshes with a gear 58 on the shaft 51. The gear 58 may make one revolution for every tenth of a revolution made by the shaft 55. Any other suitable counter or totalizing mechanism may be employed to indicate the total volume of liquid delivered into the tank 10.

The meter proper may, of course, be housed in a suitable box or enclosure 59, which, as best shown in Figure 5, may be secured, as by brackets 60, to the panel board 18. The front of the box may consist of a cover 61, which is preferably hingedly secured near a side edge of the box and which may thus be swung open, if desired. There may be apertures or windows 62, 63, 64, 65 and 66 in the cover 61, which permit a reading of the significant figures of the various dials to be made without opening the cover. There is preferably also an opening 67 in the cover 61, through which the knob 47 projects so as to permit a resetting of the dial 48 to zero to be made without opening the cover.

I have not gone into a description of all of the bearing elements provided for the various shafts of the instrument, because they are clearly shown in the drawings, and the instrument-maker will have no trouble in furnishing appropriate bearings where needed. It is to be understood that various changes or modifications might be made in the instrument proper and its assembly with a tank whose cross-sectional area is a variable from its bottom to its top, without departing from the spirit or scope of invention as defined by the appended claims.

I claim:

1. A liquid metering instrument adapted for use in connection with a tank whose cross-sectional area is a variable from its bottom to its top, comprising a shaft, means for rotating said shaft at a rate corresponding with the rise and fall of liquid level in said tank, another shaft interconnected with said first-named shaft only with the rise of the liquid level in said tank, said interconnecting means including a smooth-edged cam and cam follower following such edge designed to rotate said second-named shaft at a rate corresponding precisely with any volume of liquid delivered into said tank, a rotary element actuable by said cam follower, and mechanism for clutching said rotary element to said second-named shaft only when said element is actuated by rise of liquid level in said tank, and a dial associated with said second-named shaft and actuated thereby to indicate the volume of liquid delivered into said tank.

2. A liquid metering instrument adapted for use in connection with a tank whose cross-sectional area is a variable from its bottom to its top, comprising a shaft, means for rotating said shaft at a rate corresponding with the rise and fall of liquid level in said tank, a dial associated with said shaft and actuated thereby to indicate the volume of liquid present in said tank at any time, another shaft interconnected with said first-named shaft only with the rise of liquid level in said tank, said interconnecting means including a smooth-edged cam and cam follower following such edge designed to rotate said second-named shaft at a rate corresponding precisely with any volume of liquid delivered into said tank, a rotary element actuable by said cam follower, and mechanism for clutching said rotary element to said second-named shaft only when said element is actuated by rise of liquid level in said tank, and a dial associated with said second-named shaft and actuated thereby to indicate the volume of liquid delivered into said tank.

3. A liquid metering instrument adapted for use in combination with a tank whose cross-sectional area is a variable from its bottom to its top, comprising a shaft, means for rotating said shaft at a rate corresponding with the rise and fall of liquid level in said tank, another shaft interconnected with said first-named shaft only with the rise of liquid level in said tank, said interconnecting means including a cam and cam follower designed to rotate said second-named shaft at a rate corresponding precisely with any volume of liquid delivered into said tank, a rotary element actuable by said cam follower, and mechanism for clutching said rotary element to said second-named shaft only when said element is actuated by rise of liquid level in said tank, and a pair of dials, one of which is affixed to said second-named shaft and one of which is frictionally engaged thereby, both dials of said pair indicating the volume of liquid delivered into said tank but the frictionally engaged one being capable of being reset by hand to a zero reading without turning said second-named shaft.

WALTER van PATTEFSTEIGER.